(12) United States Patent
Kanamaru

(10) Patent No.: US 7,499,543 B2
(45) Date of Patent: Mar. 3, 2009

(54) LINEAR CONVERSION CIRCUIT AND ENCRYPTION CIRCUIT

(75) Inventor: Shoji Kanamaru, Tokyo (JP)

(73) Assignee: Sony Corporation, Tokyo (JP)

( * ) Notice: Subject to any disclaimer, the term of this patent is extended or adjusted under 35 U.S.C. 154(b) by 847 days.

(21) Appl. No.: 10/773,148

(22) Filed: Feb. 9, 2004

(65) Prior Publication Data

US 2005/0002522 A1    Jan. 6, 2005

(30) Foreign Application Priority Data

Feb. 13, 2003    (JP) .............................. 2003-034591

(51) Int. Cl.
*H04K 1/00* (2006.01)
(52) U.S. Cl. ...................................................... 380/29
(58) Field of Classification Search .................... 380/29
See application file for complete search history.

(56) References Cited

U.S. PATENT DOCUMENTS

| | | | | |
|---|---|---|---|---|
| 5,600,720 A | * | 2/1997 | Iwamura et al. ................ 380/1 |
| 6,570,989 B1 | * | 5/2003 | Ohmori et al. ................ 380/42 |
| 6,668,057 B1 | * | 12/2003 | Otsuka et al. ................ 379/283 |
| 6,891,950 B1 | * | 5/2005 | Oomori et al. ................ 380/44 |
| 6,956,951 B2 | * | 10/2005 | Shimoyama et al. ........ 380/277 |
| 6,985,582 B1 | * | 1/2006 | Sano et al. .................... 380/42 |
| 7,035,407 B1 | * | 4/2006 | Hasegawa .................... 380/37 |
| 2002/0021801 A1 | * | 2/2002 | Shimoyama et al. .......... 380/29 |

* cited by examiner

*Primary Examiner*—Kambiz Zand
*Assistant Examiner*—Peter Poltorak
(74) *Attorney, Agent, or Firm*—Oblon, Spivak, McClelland, Maier & Neustadt, P.C.

(57) ABSTRACT

A data processing method for specifying linear conversion for making the number of active S-box maximum, wherein a plurality of linear conversion candidates satisfying a restriction on a circuit for realizing linear conversion candidates are specified among the plurality of linear conversion candidates, linear conversion processing is performed based on a plurality of input data on each of the specified linear conversion candidates, a minimum value of the number of zeros arisen in processing results thereof (a so-called active S-box) is obtained, a linear conversion candidate making the minimum value largest is specified, and a linear conversion portion is configured based on the specified linear conversion candidate.

9 Claims, 4 Drawing Sheets

LINEAR CONVERSION CIRCUIT AND ENCRYPTION CIRCUIT

BACKGROUND OF THE INVENTION

1. Field of the Invention

The present invention relates to a data processing method, an apparatus, a program thereof, a linear conversion circuit and an encryption apparatus used in designing a linear conversion circuit for performing linear conversion restricted by encoding processing, etc.

2. Description of the Related Art

A variety of encryption techniques have been developed for information security.

Common key block encryption as one kind of the encryption techniques restricts, for example, a round function composed of nonlinear processing and linear processing (diffusion processing).

Nonlinear processing of the round function is composed of a unit called an S-box and realizes nonlinearity between input and output.

Also, linear processing of the round function performs linear conversion for diffusing an effect of multi-bit input data to a plurality of bits.

As a method of using linear conversion as such, there is a method of using a Maximal Distance Separable (MDS) used in the Advanced Encryption Standard (AES), etc.

The MDS is a method of effectively performing bit diffusion by using conversion on an extension field, such as $GF(2^8)$.

However, the MDS has a disadvantage that the circuit configuration becomes complicated when being mounted.

There are encryption methods of Camellia and E2, etc. for eliminating the disadvantage. In the encryption methods, conversion on GF(2) is used for configuring a high speed and small scaled circuit.

The Japanese Unexamined Patent Publication No. 2002-91295 will be referred as a prior art.

However, to obtain high diffusion efficiency by conversion on GF(2), the circuit configuration for maximize the number of so-called active S-boxes is determined by performing calculating on all possible linear conversions regardless of restriction on a circuit for realizing linear conversion, and there is a disadvantage that a large amount of calculation becomes necessary.

Here, the number of active S-boxes is the minimum value of the number of zeros arisen in results of performing linear processing of the above round function on a plurality of input data.

SUMMARY OF THE INVENTION

An object of the present invention is to provide a data processing method, an apparatus thereof and a program thereof by which a linear conversion candidate wherein a minimum value of the number of zeros arisen in a result of linearly converting a plurality of input data becomes the maximum can be specified from a plurality of linear conversion candidates with a smaller amount of calculation than that in the related art.

Also, an object of the present invention is to provide a linear conversion circuit and an encryption apparatus designed by the above data processing method, an apparatus thereof and a program thereof.

To attain the above objects, according to a first invention, there is provided a data processing method performed by a computer, comprising a first step for specifying a plurality of linear conversion candidates respectively satisfying a restriction on a circuit for realizing linear conversion; a second step for specifying for each of the plurality of linear conversion candidates specified in the first step a minimum value of the number of zeros arisen in respective results of performing linear conversion restricted by the linear conversion candidates on a plurality of input data; and a third step for specifying the linear conversion candidate wherein the minimum value specified in the second step becomes largest among the plurality of linear conversion candidates specified in the first step.

An effect of a data processing method of the first invention becomes as below.

First, in the first step, a computer specifies a plurality of linear conversion candidates respectively satisfying a restriction on a circuit for realizing linear conversion.

Next, in the second step, for each of the plurality of linear conversion candidates specified in the first step, the computer specifies a minimum value of the number of zeros arisen as a result of performing linear conversion restricted by the linear conversion candidates on a plurality of input data.

Then, in the third step, from the plurality of linear conversion candidates specified in the first step, the computer specifies a linear conversion candidate by which the minimum value specified in the second step becomes largest.

In the data processing method of the first invention, preferably the first step specifies as the plurality of linear conversion candidates linear conversion which is a combination of a plurality of unit linear conversions wherein one of two zero regions in a replacing matrix is replaced by a conversion matrix; and the second step specifies the minimum value for each of the linear conversion candidates obtained by giving a plurality of different matrixes as the conversion matrixes of the plurality of unit linear conversion.

According to a second invention, there is provided a program to be executed by a computer, comprising a first procedure for specifying a plurality of linear conversion candidates respectively satisfying a restriction on a circuit for realizing linear conversion; a second procedure for specifying for each of the plurality of linear conversion candidates specified in the first procedure a minimum value of the number of zeros arisen in respective results of performing linear conversion restricted by the linear conversion candidates on a plurality of input data; and a third procedure for specifying the linear conversion candidate wherein the minimum value specified in the second procedure becomes largest among the plurality of linear conversion candidates specified in the first procedure.

A program of the second invention is executed by a computer and realizes the respective steps of the first invention explained above.

According to a third invention, there is provided a data processing apparatus, comprising a first means for specifying a plurality of linear conversion candidates respectively satisfying a restriction on a circuit for realizing linear conversion; a second means for specifying for each of the plurality of linear conversion candidates specified in the first means a minimum value of the number of zeros arisen in respective results of performing linear conversion restricted by the linear conversion candidates on a plurality of input data; and a third means for specifying the linear conversion candidate wherein the minimum value specified in the second means becomes largest among the plurality of linear conversion candidates specified in the first means.

An effect of a data processing apparatus of the third invention is as below.

First, in the first means, a plurality of linear conversion candidates respectively satisfying a restriction on a circuit for realizing linear conversion are specified.

Next, in the second means, for each of the plurality of linear conversion candidates specified in the first means, a minimum value of the number of zeros arisen in the respective results of performing linear conversion restricted by the linear conversion candidates for a plurality of input data is specified.

Next, in the third means, among the plurality of linear candidates specified in the first means, the linear conversion candidate by which the minimum value specified in the second means becomes largest is specified.

According to a fourth invention, there is provided a linear conversion circuit for performing linear conversion restricted in round function processing of common key block encryption, comprising a plurality of data lines corresponding respectively to a plurality of data; and a plurality of circuit blocks for performing linear conversion successively on the plurality of data input via the plurality of data lines; wherein each of the circuit blocks comprises a calculation circuit provided on a part of the plurality of data lines among the plurality of data lines and is configured so that data is supplied to at most one of the calculation circuits from the data lines not provided with a calculation circuit.

According to a fifth invention, there is provided an encryption apparatus for performing common key block encryption by performing round function processing, comprising a non linear conversion circuit for performing nonlinear conversion restricted in the round function processing; and a linear conversion circuit for performing linear conversion on input data subjected to the nonlinear conversion by the nonlinear conversion circuit; wherein the linear conversion circuit comprises a plurality of data lines corresponding respectively to a plurality of data composing the input data; and a plurality of circuit blocks for performing linear conversion successively on the plurality of data input via the data lines; and each of the circuit blocks comprises a calculation circuit provided on a part of the plurality of data lines among the plurality of data lines and is configured so that data is supplied to at most one of the calculation circuits from the data lines not provided with a calculation circuit.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Below, a circuit design method and an encryption apparatus according to an embodiment of the present invention will be explained.

First, an encryption apparatus incorporating a linear conversion circuit designed by a circuit design method of the present embodiment will be explained.

The encryption apparatus 1 corresponds to an encryption apparatus of the fifth invention.

Figure 1:
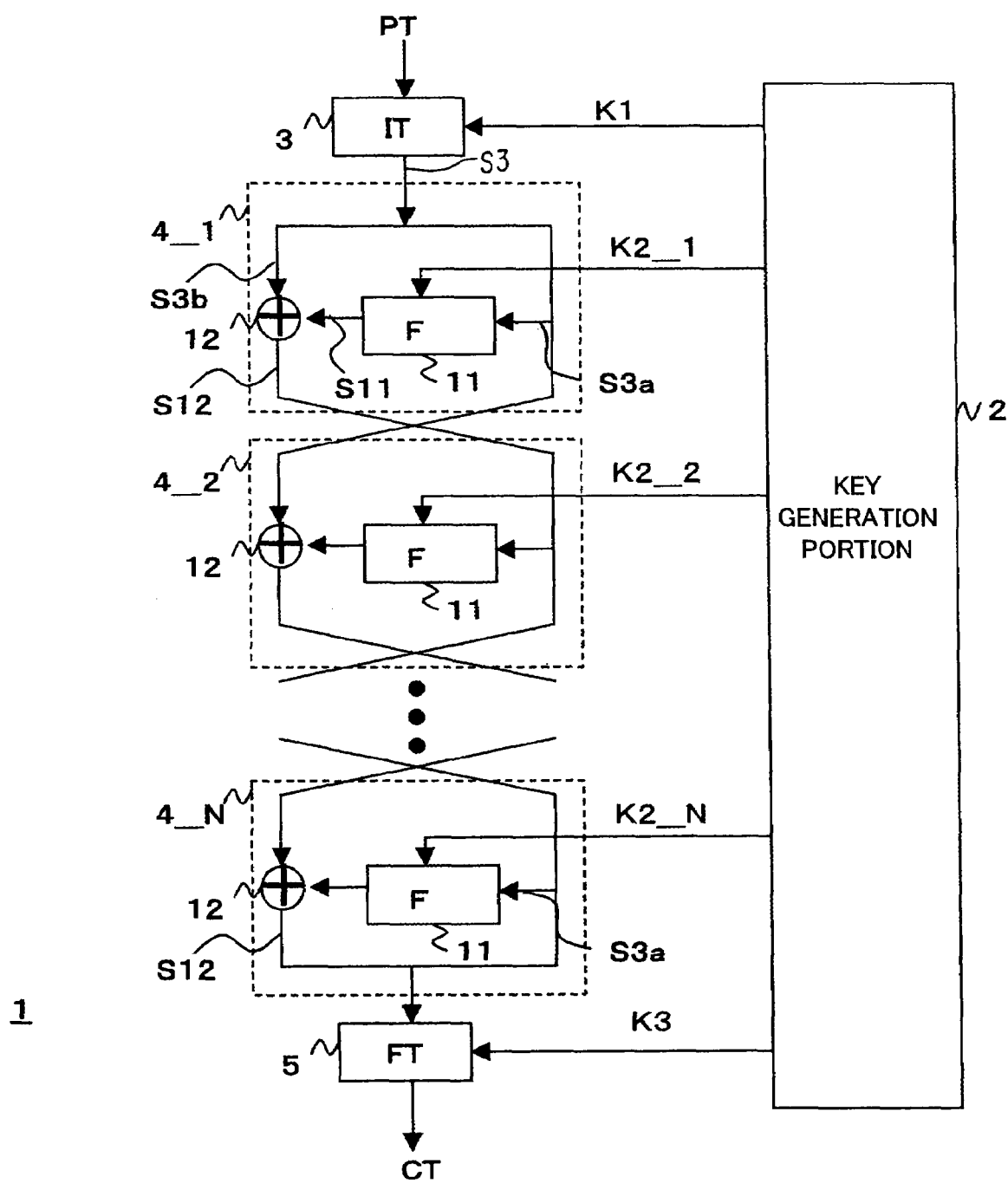
FIG. 1 is a view of the configuration of an encryption apparatus according to an embodiment of the present invention.

FIG. 1 is a view of the configuration of an encryption apparatus 1 of the present embodiment.

An encryption apparatus 1 corresponds to the encryption apparatus of the fifth invention.

As shown in FIG. 1, the encryption apparatus 1 comprises, for example, a key generation circuit 2, an initialization processing circuit 3, N number of Feistel structure modules 4_1 to 4_N and a post processing circuit 5. Here, N is an integer of two or more.

The encryption apparatus 1 performs common key block encryption.

The key generation circuit 2 generates key data K1, K2_1 to K2_N and K3, outputs the key data K1 to the initialization processing circuit 3, outputs the key data K2_1 to K2_N respectively to the Feistel structure modules 4_1 to 4_N and outputs the key data K3 to the post processing circuit 5.

The initialization processing circuit 3 performs initialization conversion on input plain data PT and generates data S3.

The data S3 is, for example, 128-bit data.

The initialization processing circuit 3 outputs data S3$a$ which is lower 64 bits of the data S3 to the F function circuit 11 of the Feistel structure module 4_1 and outputs upper 64 bits of data S3$b$ to an exclusive OR (XOR) circuit 12 of the Feistel structure module 4_1.

Each of the Feistel structure modules 4_1 to 4_N comprises an F function circuit 11 and the XOR circuit 12.

The Feistel structure modules 4_1 to 4_N are connected in series and have the same configuration.

Below, the Feistel structure module 4_1 will be explained.

The F function circuit 11 performs nonlinear processing and linear processing (diffusion processing) on the data S3$a$ from the initial processing circuit 3, generates data S11 and outputs the same to the XOR circuit 12.

The F function circuit 11 performs round function processing of the present invention.

The configuration of the F function circuit 11 will be explained in detail later on.

The XOR circuit 12 calculates an XOR of the data S3$b$ from the initialization processing circuit 3 and the data S11 from the F function circuit 11 and outputs data S12 as a result thereof to the F function circuit 11 of the Feistel structure module 4_2 on the subsequent stage.

Also, the F function circuit 11 is configured to output the data S3$a$ from the initialization processing circuit 3 to the XOR circuit 12 of the Feistel structure module 4_2 on the subsequent stage.

128-bit data wherein the lower 64 bits are the data S3$a$ from the Feistel structure module 4_N-1 on the former stage and the higher 64 bits are data S12 from the XOR circuit 12 of the Feistel structure module 4_N is output from the Feistel structure module 4_N on the final stage to the post processing circuit 5.

The post processing circuit 5 performs post processing by using key data K3 from the key generation circuit 2 on the 128-bit data from the Feistel structure module 4_N and outputs encryption data CT as a result thereof.

Below, the structure of the F function circuit 11 shown in FIG. 1 will be explained.

Figure 2:
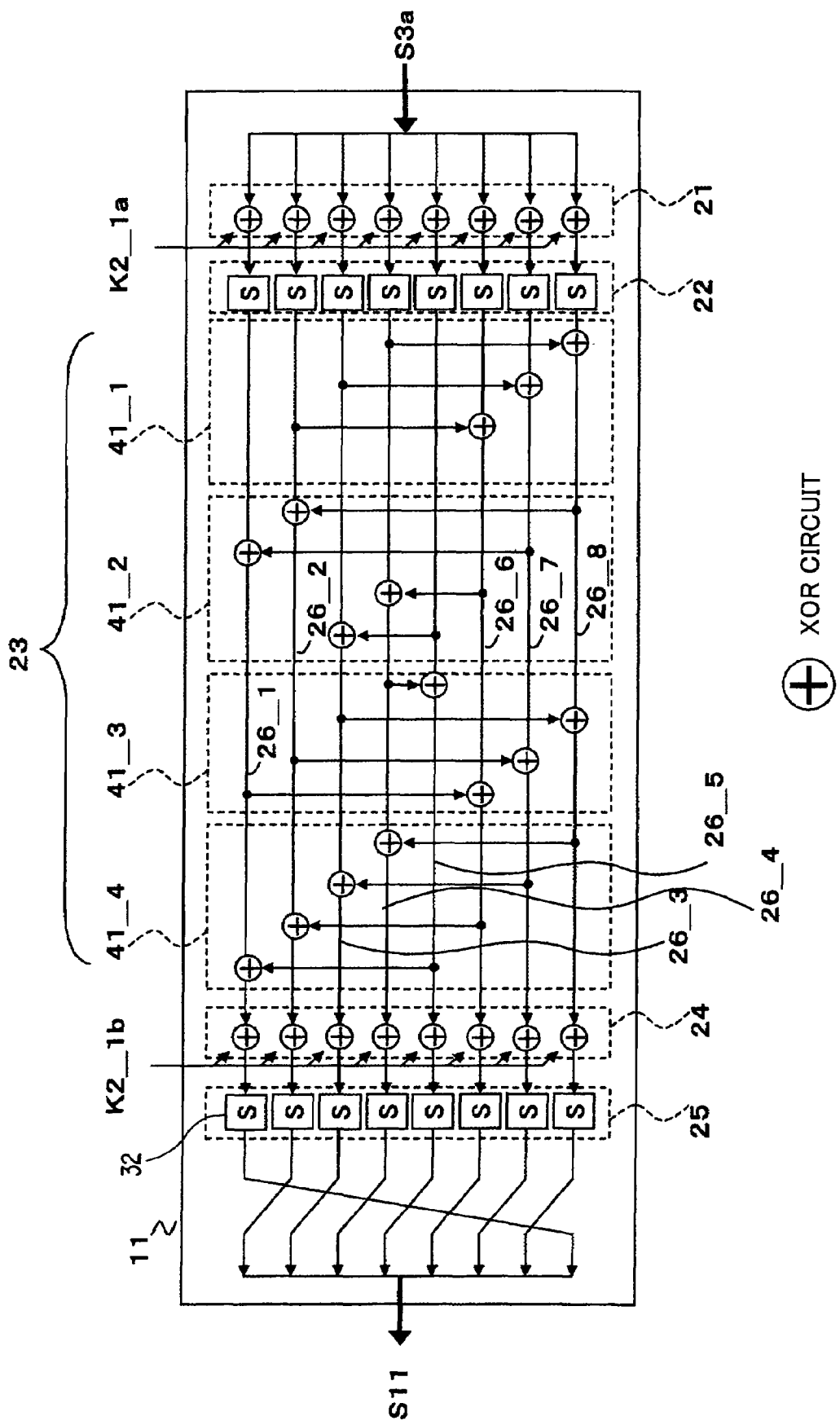
FIG. 2 is a view of the configuration of an F function circuit shown in FIG. 1.

FIG. 2 is a view of the configuration of the F function circuit 11 shown in FIG. 1.

As shown in FIG. 2, the F function circuit 11 comprises, for example, an XOR portion 21, a nonlinear conversion portion 22, a linear conversion portion 23, an XOR portion 24 and a nonlinear conversion portion 25.

Here, the nonlinear conversion portion 22 corresponds to the nonlinear conversion circuit of the fifth invention.

Also, the linear conversion portion 23 is an object to be designed by using the first invention to the third invention and corresponds to the linear conversion circuit of the fourth and fifth inventions.

In the F function circuit 11, input 64-bit data S3a is divided to eight 8-bit data modules to be subjected to processing.

The XOR portion 21 performs XOR calculation on each of the eight data modules obtained by dividing the data S3a with the key data K1 input from the key generation circuit 2 and outputs the results to the nonlinear conversion portion 22.

The nonlinear conversion portion 22 has nonlinear conversion circuits 31 provided respectively for the above eight data modules, performs nonlinear conversion processing on the input data modules in the nonlinear conversion circuits 31 and outputs the eight data modules as the result to the linear conversion portion 23.

The nonlinear conversion circuit 31 is called, for example, an S-box.

The linear conversion portion 23 performs diffusion processing as calculation on GF(2) in unit of a byte on data from the nonlinear conversion portion 22.

The linear conversion portion 23 has eight data lines 26_1 to 26_8 (data lines of the fourth and fifth inventions) for respectively sending eight data modules input from the nonlinear conversion portion 22.

The linear conversion portion 23 has, as shown in FIG. 2, four circuit blocks 41_1 to 41_4 connected in series (circuit blocks of the fourth and fifth inventions).

The circuit block 41_1 is provided with XOR circuits (the calculation circuit of the fourth and fifth inventions) on the respective data lines 26_5 to 26_8.

Also, it is wired so that data modules on the data lines 26_1, 26_2, 26_3 and 26_4 are input to the XOR circuits on the data lines 26_5, 26_6, 26_7 and 26_8.

The circuit block 41_2 is provided with XOR circuits on the respective data lines 26_1 to 26_4.

Also, it is wired so that data modules on the data lines 26_5, 26_6, 26_7 and 26_8 are input to the XOR circuits on the data lines 26_3, 26_4, 26_1 and 26_2.

Also, it is wired so that data modules on the data lines 26_1, 26_2, 26_3 and 26_4 are input to the XOR circuits on the data lines 26_6, 26_7, 26_8 and 26_5.

Also, it is wired so that data modules on the data lines 26_5, 26_6, 26_7 and 26_8 are input to the XOR circuits on the data lines 26_1, 26_2, 26_3 and 26_4.

The XOR portion 24 performs XOR calculation on the eight data modules input from the linear conversion portion 23 with key data K3 input from the key generation circuit 2 and outputs the result to the nonlinear conversion portion 25.

The nonlinear conversion portion 25 has nonlinear conversion circuits 32 provided respectively to the above eight data modules from the XOR portions 24, performs in the nonlinear conversion circuits 32 nonlinear conversion processing on the input data modules and outputs eight data modules as results thereof.

The nonlinear conversion circuit 32 is called, for example, an S-box.

The eight data modules output from the nonlinear conversion portion 25 are, as shown in FIG. 2, combined and output as data S11 shown in FIG. 1 to the XOR circuit 12.

Below, a method of designing the linear conversion portion 23 of the F function circuit 11 shown in FIG. 2 will be explained.

Figure 3:
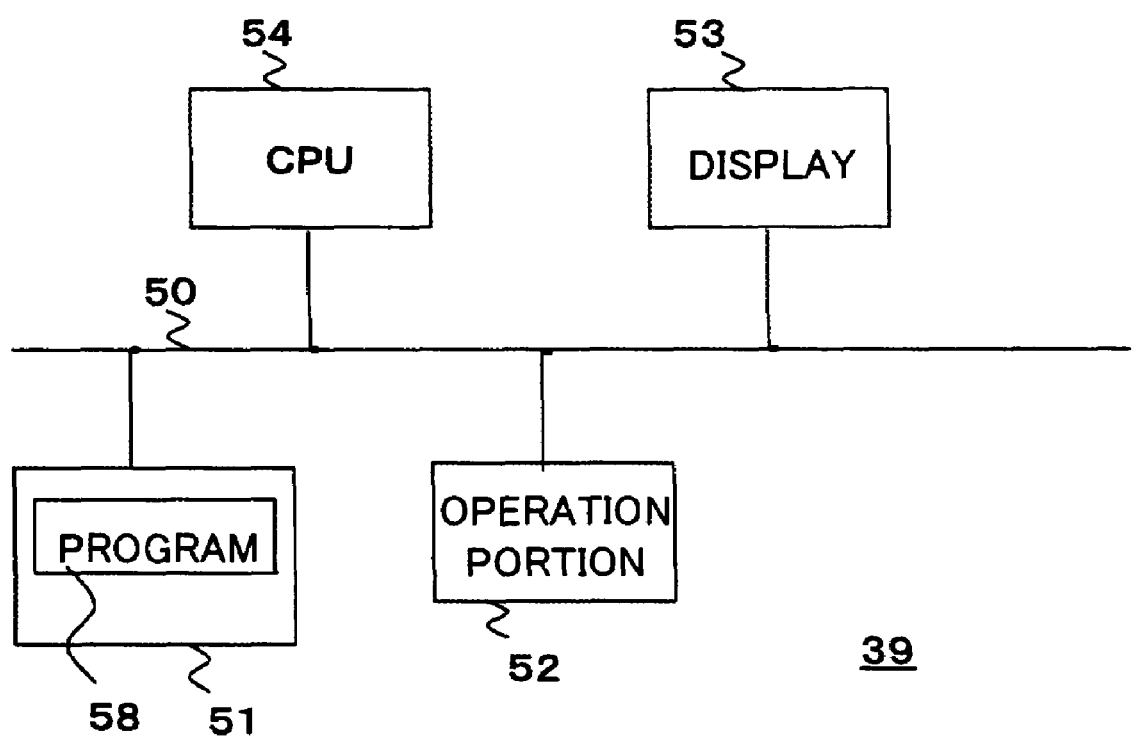
FIG. 3 is a view for explaining a computer used in designing a linear conversion portion of the F function circuit shown in FIG. 2.

FIG. 3 is a view for explaining a computer 39 used for designing the linear conversion portion 23 of the F function circuit 11 shown in FIG. 2.

As shown in FIG. 3, the computer 39 comprises, for example, a memory 51, an operation portion 52, a display 53 and a CPU 54, and these are connected via a bus 50.

Here, the computer 39 corresponds to the data processing apparatus of the third invention.

The memory 51 stores a program 48 (the program of the second invention) for the computer 39 to execute and a variety of data used by the computer 39 for executing the program 48.

The operation portion 52 is a key board or a mouse, etc. and outputs an operation signal in accordance with an operation by a user to the CPU 54.

The display 53 displays a processing result of the computer 39.

The CPU 54 executes a program 58 read from the memory 51 and performs design processing of the F function circuit 11 shown in FIG. 2.

The CPU 54 specifies from a plurality of linear conversion candidates a plurality of linear conversion candidates satisfying a restriction on a circuit for realizing the linear conversion candidates, performs linear conversion processing based on a plurality of input data on each of the specified linear conversion candidates, obtains a minimum value of the number of zeros arisen in the processing result (so-called an active S-box), and specifies a linear conversion candidate which makes the minimum value maximum. Then, the CPU 54 configures the linear conversion portion 23 shown in FIG. 2 based on the specified linear conversion candidate.

Below, a procedure of design processing of the CPU 54 (a design method of the present embodiment) will be explained.

Figure 4:
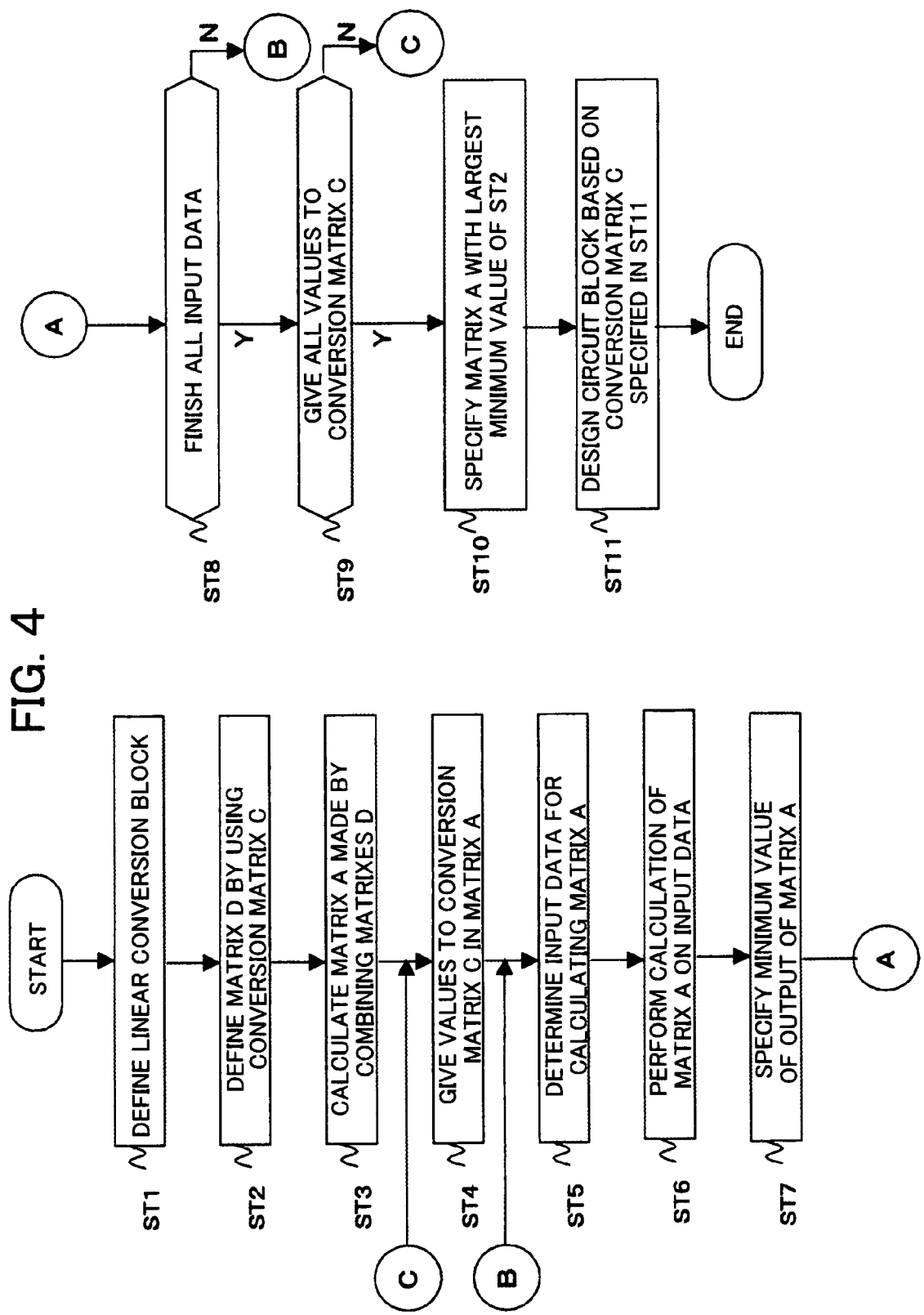
FIG. 4 is a flowchart for explaining a procedure of design processing of a CPU shown in FIG. 3.

FIG. 4 is a flowchart for explaining the design processing procedure of the CPU 54.

A part of the procedure below is, for example, performed interactively between a user and the CPU 54 in accordance with an operation on the operation portion 52 by the user based on an operation screen displayed on the display 53 by the CPU 54.

Note that steps ST1 to ST3 shown in FIG. 4 correspond to a first step of the first invention, a first procedure of the second invention and a first means of the third invention.

Steps ST4 to ST9 correspond to a second step of the first invention, a second procedure of the second invention and a second means of the third invention.

A step ST10 corresponds to a third step of the first invention, a third procedure of the second invention and a third means of the third invention.

Step ST1:

A user defines linear conversion of the linear conversion potion 23 shown in FIG. 2 as an object to be designed by dividing the same to four linear conversion blocks and gives the information to the CPU 54 via the operation portion 52.

Step ST2:

The CPU 54 defines matrixes $D_1$, $D_2$, $D_3$ and $D_4$ by using conversion matrixes $C_1$, $C_2$, $C_3$ and $C_4$ being matrixes of 4 by 4 based on information received on the step ST1 as shown in formulas (2), (3), (4) and (5) below.

As explained above, by defining matrixes $D_1$, $D_2$, $D_3$ and $D_4$ being matrixes of 8 by 8, circuits 41_1 to 41_4 shown in FIG. 2 realizing the matrixes $D_1$, $D_2$, $D_3$ and $D_4$ can be configured to output a data module from a data line not provided with an XOR circuit to at most one XOR circuit. As a result, the restriction on the circuit blocks 41_1 to 41_4 is satisfied.

Specifically, as shown in FIG. 2, by providing XOR circuits on upper or lower four data lines, the circuit blocks 41_1 to 41_4 can be configured to output data modules from four data lines not provided with an XOR circuit to the above different XOR circuits.

Namely, in the present embodiment, by restricting the matrixes $D_1$ to $D_4$ as explained above, those not satisfying the restriction on the circuit can be omitted in advance from candidates of the matrixes $D_1$ to $D_4$.

$$D_1 = \begin{pmatrix} I & O \\ C_1 & I \end{pmatrix} \quad (2)$$

$$D_2 = \begin{pmatrix} I & C_2 \\ O & I \end{pmatrix} \quad (3)$$

$$D_3 = \begin{pmatrix} I & O \\ C_3 & I \end{pmatrix} \quad (4)$$

$$D_4 = \begin{pmatrix} I & C_4 \\ O & I \end{pmatrix} \quad (5)$$

Step ST3:

The CPU 54 calculates a matrix A (a linear conversion candidate of the present invention) wherein the matrixes $D_1$, $D_2$, $D_3$ and $D_4$ defined in the step ST2 are combined as shown in formulas (6) and (7) below.

$$A = D_1 D_2 D_3 D_4 \quad (6)$$

$$A = \begin{pmatrix} I & C_4 \\ O & I \end{pmatrix}\begin{pmatrix} I & O \\ C_3 & I \end{pmatrix}\begin{pmatrix} I & C_2 \\ O & I \end{pmatrix}\begin{pmatrix} I & O \\ C_1 & I \end{pmatrix} \quad (7)$$

$$= \begin{pmatrix} I + C_4 C_3 + C_2 C_1 + C_4 C_3 C_2 C_1 + C_4 C_1 & C_2 + C_4 C_3 C_2 + C_4 \\ C_3 + C_3 C_2 C_1 + C_1 & I + C_3 C_2 \end{pmatrix}$$

Step ST4:

The CPU 54 gives predetermined values to respective elements of the conversion matrixes $C_1$, $C_2$, $C_3$ and $C_4$ in the matrix A generated in the step ST3.

As a result, "specifying of a plurality of linear conversion candidates" explained in the present invention is performed.

Note that the CPU 54 performs processing of the step ST4 for a plurality of times by loop-back from a step ST9 and defines different matrix A each time.

Step ST5:

The CPU 54 determines input data to be input to the matrix A next, that is, an object to be calculated by the matrix A among a plurality of input data determined in advance (input data of the present invention).

Note that the CPU 54 performs processing of the step ST5 for a plurality of times by loop-back from the step ST8 and determines different input data each time.

Step ST6:

The CPU 54 operates calculation of the matrix A determined in the step ST4 on the input data determined in the step ST5.

Step ST7:

The CPU 54 counts the number of zeros included in the calculation result (64-bit data) of the step ST6 and updates a minimum value when the counter value is smaller than the minimum value counted so far. The CPU 54 obtains the minimum value (the minimum value of the present invention) for all of the matrixes A, respectively.

Step ST8:

The CPU 54 judges whether or not processing of the step ST6 is performed on all of input data determined in advance and proceeds to a step ST9 when judged yes, while not, returns back to the step ST5.

Step ST9:

The CPU 54 judges whether or not processing of the step ST6 is performed on all of the matrixes A which can be defined by using the conversion matrixes $C_1$, $C_2$, $C_3$ and $C_4$, proceeds to a step ST10 when judged yes, while not, returns back to processing of the step ST4.

Step ST10:

The CPU 54 specifies a matrix A giving the largest minimum value among minimum values of the all matrixes A finally obtained in the step ST2.

Step ST11:

The CPU 54 uses the conversion matrixes $C_1$, $C_2$, $C_3$ and $C_4$ used in the matrix A specified in the step ST10 and configures (designs) the circuit blocks 41_1 to 41_4 of the linear conversion portion 23 shown in FIG. 2.

As explained above, according to the design method of the present embodiment, a plurality of linear conversion candidates satisfying a restriction on a circuit realizing the linear conversion candidates among the plurality of linear conversion candidates is specified and, from the specified linear conversion candidates, a linear calculation candidate which makes the minimum value of the number of zeros arisen in a result of the linear conversion maximum is searched (specified), so that an amount of calculation can be largely reduced comparing with the case of searching from all linear conversion candidates.

Specifically, according to a design method of the present embodiment, there are candidates of 4! (factorial of 4) patterns since each of the conversion matrixes $C_1$ to $C_4$ is a matrix of 4 by 4. Accordingly, combination of ($C_1$, $C_2$, $C_3$ and $C_4$) becomes $(4!)^4$ patterns, consequently, there are about $2^{18}$ patterns of the linear conversion candidates.

On the other hand, there are $2^{64}$ patterns of linear conversion candidates in the case of the related art since all of matrixes of 8 by 8 on GF(2) are regarded as linear conversion candidates.

Accordingly, according to a design method of the present embodiment, an amount of calculation for the designing can be largely reduced comparing with that in the related art. As a result, according to the present embodiment, the linear conversion portion 23 can be designed in a practical time.

The present invention is not limited to the above embodiments.

In the above embodiments, the case of performing conversion on GF(2) in unit of a byte to perform 32-bit calculation at a high speed was taken as an example, but the present invention may be designed so as to perform the above linear conversion by performing 64-bit calculation by using a 16-bit word as a unit of conversion on GF(2) or performing 64-bit calculation by using a byte as a unit of conversion on GF(2).

As explained above, according to the present invention, it is possible to provide a data processing method, an apparatus thereof and a program thereof by which a linear conversion candidate with the largest minimum value of the number of zeros arisen in a result of performing linear conversion on a plurality of input data can be specified among a plurality of linear conversion candidates with a smaller amount of calculation comparing with that in the case of the related art.

Also, according to the present invention, it is possible to provide a linear conversion circuit and an encryption apparatus designed by the above data processing method, an apparatus thereof and a program thereof of the present invention.

The embodiments explained above are for easier understanding of the present invention and not to limit the present invention. Accordingly, respective elements disclosed in the above embodiments includes all modifications in designs and equivalents belonging to the technical field of the present invention.

What is claimed is:

1. A data processing method performed by a computer, comprising:
    a first step for specifying a plurality of linear conversion candidates respectively satisfying a restriction on a circuit for realizing linear conversion;
    a second step for specifying for each of said plurality of linear conversion candidates specified in said first step a minimum value of the number of zeros arisen in respective results of performing linear conversion restricted by the linear conversion candidates on a plurality of input data; and
    a third step for specifying said linear conversion candidate wherein said minimum value specified in said second step becomes largest among said plurality of linear conversion candidates specified in said first step.

2. A data processing method as set forth in claim 1, wherein:
    said first step specifies as said plurality of linear conversion candidates linear conversion which is a combination of a plurality of unit linear conversions wherein one of two zero regions in a replacing matrix is replaced by a conversion matrix; and
    said second step specifies said minimum value for each of said linear conversion candidates obtained by giving a plurality of different matrixes as said conversion matrixes of said plurality of unit linear conversion.

3. A data processing method as set forth in claim 2, wherein:
    the number of said plurality of unit linear conversion is M; and
    said unit linear conversion is realized by calculation of a matrix of M by M.

4. A data processing method as set forth in claim 3, wherein said first step defines said linear conversion candidates by a formula (1) below by using conversion matrixes $C_1$, $C_2$, $C_3$ and $C_4$ $$\begin{pmatrix} I + C_4C_3 + C_2C_1 + C_4C_3C_2C_1 + C_4C_1 & C_2 + C_4C_3C_2 + C_4 \\ C_3 + C_3C_2C_1 + C_1 & I + C_3C_2 \end{pmatrix}. \quad (1)$$

5. A data processing method as set forth in claim 1, wherein
    when said linear conversion is a linear conversion restricted in round function processing of common key block encryption, said second step performs said linear conversion on said input data obtained by performing nonlinear diffusion processing on a plain data.

6. A data processing method as set forth in claim 1, further comprising a fourth step for configuring a linear conversion circuit having a circuit block for realizing said unit linear conversion corresponding to said linear conversion candidates specified in said third step.

7. A computer-readable memory including a program to be executed by a computer, comprising:
    a first procedure for specifying a plurality of linear conversion candidates respectively satisfying a restriction on a circuit for realizing linear conversion;
    a second procedure for specifying for each of said plurality of linear conversion candidates specified in said first procedure a minimum value of the number of zeros arisen in respective results of performing linear conversion restricted by the linear conversion candidates on a plurality of input data; and
    a third procedure for specifying said linear conversion candidate wherein said minimum value specified in said second procedure becomes largest among said plurality of linear conversion candidates specified in said first procedure.

8. A computer-readable memory as set forth in claim 7, wherein:
    said first procedure specifies as said plurality of linear conversion candidates linear conversion which is a combination of a plurality of unit linear conversions wherein one of two zero regions in a replacing matrix is replaced by a conversion matrix; and
    said second procedure specifies said minimum value for each of said linear conversion candidates obtained by giving a plurality of different matrixes as said conversion matrixes of said plurality of unit linear conversion.

9. A data processing apparatus, comprising:
    a processor configured to specify a plurality of linear conversion candidates respectively satisfying a restriction on a circuit for realizing linear conversion;
    a processor configured to specify for each of said plurality of linear conversion candidates a minimum value of the number of zeros arisen in respective results of performing linear conversion restricted by the linear conversion candidates on a plurality of input data; and
    a processor configured to specify said linear conversion candidate wherein said minimum value becomes largest among said plurality of linear conversion candidates.

* * * * *